United States Patent
Kämpf

(10) Patent No.: US 10,890,999 B2
(45) Date of Patent: Jan. 12, 2021

(54) SPRING-TYPE BATTERY CONTACT HAVING SENSOR PROTECTION

(71) Applicant: STABILO International GmbH, Heroldsberg (DE)

(72) Inventor: Karl-Peter Kämpf, Röttenbach (DE)

(73) Assignee: STABILO International GmbH, Heroldsberg (DE)

(*) Notice: Subject to any disclaimer, the term of this patent is extended or adjusted under 35 U.S.C. 154(b) by 19 days.

(21) Appl. No.: 16/313,076

(22) PCT Filed: Jun. 22, 2017

(86) PCT No.: PCT/EP2017/065403
§ 371 (c)(1),
(2) Date: Dec. 24, 2018

(87) PCT Pub. No.: WO2018/001859
PCT Pub. Date: Jan. 4, 2018

(65) Prior Publication Data
US 2020/0033986 A1  Jan. 30, 2020

(30) Foreign Application Priority Data
Jun. 28, 2016  (DE) .................... 20 2016 103 403 U

(51) Int. Cl.
*G06F 3/0354* (2013.01)
*G06F 3/041* (2006.01)
*G06F 3/01* (2006.01)
*G06F 3/0488* (2013.01)

(52) U.S. Cl.
CPC ............ *G06F 3/0414* (2013.01); *G06F 3/016* (2013.01); *G06F 3/03545* (2013.01); *G06F 3/04883* (2013.01)

(58) Field of Classification Search
CPC .... G06F 3/0414; G06F 3/016; G06F 3/03545; G06F 3/04883
See application file for complete search history.

(56) References Cited

U.S. PATENT DOCUMENTS

| | | | | |
|---|---|---|---|---|
| 5,446,633 A | * | 8/1995 | Hanggi | B43K 29/10 320/107 |
| 7,202,862 B1 | | 4/2007 | Palay et al. | |
| 7,657,128 B2 | | 2/2010 | Silverbrook et al. | |

(Continued)

FOREIGN PATENT DOCUMENTS

| | | |
|---|---|---|
| EP | 2590060 A1 | 5/2013 |
| JP | H10307670 A | 11/1998 |

(Continued)

*Primary Examiner* — Jose R Soto Lopez
(74) *Attorney, Agent, or Firm* — Bradley Arant Boult Cummings; Timothy L. Capria

(57) ABSTRACT

An electronic pen comprising pen position recognition means, comprising at least one electrical voltage source, at least one digital control unit, a force transmission element, and at least one force sensor for measuring a writing pressure force, characterized in that the electronic pen comprises at least one resilient means, and the at least one resilient means being configured to generate a force that opposes the pressure force acting on the at least one force sensor. Also disclosed are methods for preventing overloading of a force sensor for measuring a writing pressure force for an electronic pen.

17 Claims, 4 Drawing Sheets

(56) References Cited

U.S. PATENT DOCUMENTS

| | | | |
|---|---|---|---|
| 9,239,639 B1* | 1/2016 | Vanderet | G06F 3/03545 |
| 10,372,241 B2 | 8/2019 | Aoki et al. | |
| 2005/0248549 A1* | 11/2005 | Dietz | G06F 3/016 |
| | | | 345/179 |
| 2007/0014490 A1* | 1/2007 | Silverbrook | B41J 13/106 |
| | | | 382/313 |
| 2007/0040817 A1* | 2/2007 | Underwood | B43K 29/004 |
| | | | 345/179 |
| 2008/0166175 A1* | 7/2008 | Pittel | B43K 23/001 |
| | | | 401/195 |
| 2010/0051356 A1* | 3/2010 | Stern | G06F 3/04162 |
| | | | 178/19.04 |
| 2013/0141398 A1* | 6/2013 | Cho | G06F 3/03545 |
| | | | 345/179 |
| 2015/0070330 A1* | 3/2015 | Stern | G06F 3/03545 |
| | | | 345/179 |
| 2015/0116289 A1* | 4/2015 | Stern | G06F 3/03545 |
| | | | 345/179 |
| 2015/0317001 A1* | 11/2015 | Ben-Bassat | G06F 3/0414 |
| | | | 345/179 |
| 2015/0324018 A1* | 11/2015 | Hinson | G06F 3/0416 |
| | | | 345/179 |
| 2015/0378456 A1 | 12/2015 | Ho et al. | |
| 2016/0124530 A1* | 5/2016 | Stern | G06F 3/03545 |
| | | | 345/179 |
| 2016/0195942 A1* | 7/2016 | Chen | G06F 3/03545 |
| | | | 345/179 |
| 2016/0239106 A1* | 8/2016 | Ballan | G06F 3/016 |
| 2016/0328068 A1* | 11/2016 | Ba-Tis | H02N 1/002 |
| 2017/0068345 A1* | 3/2017 | Barel | G06F 3/045 |
| 2017/0131820 A1* | 5/2017 | Pan | G01L 7/082 |
| 2017/0255266 A1* | 9/2017 | Holenarsipur | G06F 3/0362 |
| 2017/0269719 A1* | 9/2017 | Tsai | G06F 1/169 |
| 2017/0285774 A1* | 10/2017 | Parikh | G06F 3/0383 |
| 2018/0004316 A1* | 1/2018 | Anderson | G06F 3/03545 |
| 2018/0024658 A1* | 1/2018 | Yamamoto | G06F 3/046 |
| | | | 345/179 |
| 2018/0101272 A1* | 4/2018 | Xi | G06F 3/017 |
| 2019/0120606 A1* | 4/2019 | Harsila | G01B 7/001 |
| 2020/0064943 A1* | 2/2020 | Chang | G06F 3/0383 |

FOREIGN PATENT DOCUMENTS

| | | |
|---|---|---|
| JP | 5687398 B1 | 3/2015 |
| JP | 2016-012333 A | 1/2016 |
| WO | 2002007424 A2 | 1/2002 |

* cited by examiner

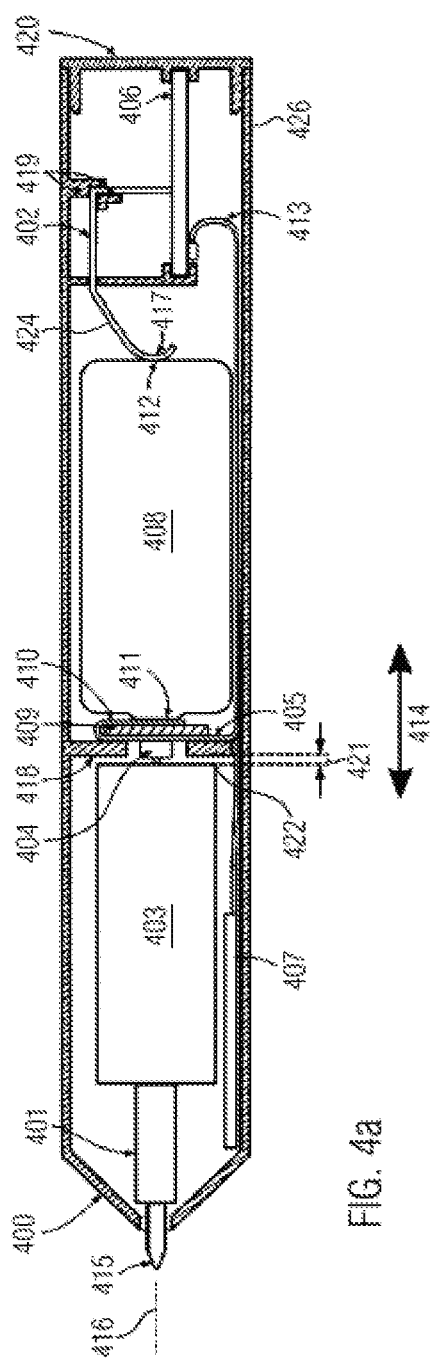
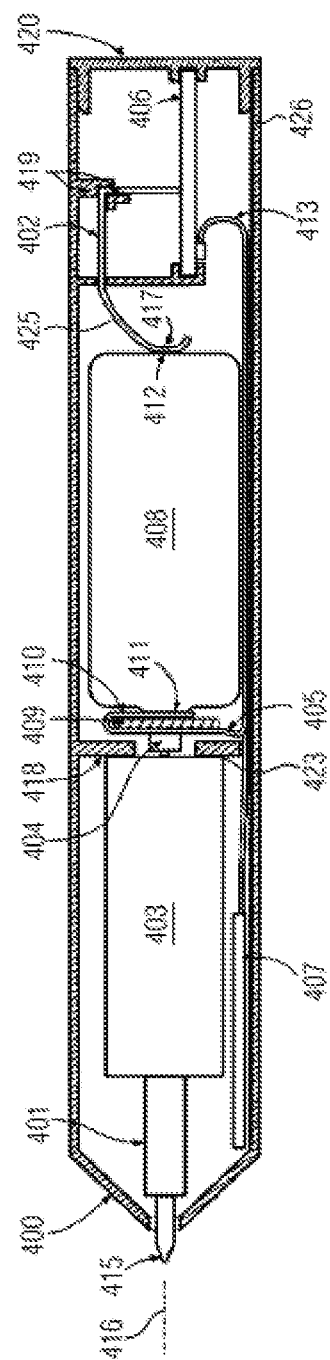
FIG. 4a
FIG. 4b

SPRING-TYPE BATTERY CONTACT HAVING SENSOR PROTECTION

This application is a nonprovisional patent application filed by applicant STABILO International GmbH for the invention by Karl-Peter Kämpf, a citizen of Germany, residing in Röttenbach, Germany, entitled, "SPRING-TYPE BATTERY CONTACT HAVING SENSOR PROTECTION." This application claims priority to International Patent Application Number PCT/EP2017/065403, filed on Jun. 22, 2017, and German Patent Application Number 202016103403.5, filed Jun. 28, 2016.

TECHNICAL FIELD

The disclosure relates to an electronic pen comprising pen position recognition means, comprising at least one electrical voltage source, at least one digital control unit, a force transmission element, and at least one force sensor for measuring a writing pressure force. This disclosure also relates to a method for preventing overloading of a force sensor for measuring a writing pressure force for an electronic pen.

BACKGROUND

The constantly increasing use of electronic information and communications systems, in particular personal computers (PCs), laptops, tablets and Smartphones, in everyday life, leisure time and the workplace means that it is expedient to develop improvements in human-machine interfaces.

In this case, in addition to input devices such as a keyboard, a mouse or touch-sensitive surfaces, input device electronic pens are of interest as human-machine interfaces. In this case, electronic pens are advantageous inter alia in that they can combine the functionality and simplicity of writing using a pen on a surface, with the range of possibilities of electronic data processing. In this case, it is desirable for the electronic pen to resemble a conventional pen as far as possible in terms of appearance, availability and handling.

WO 02/07424 A2 for example describes an electronic information system for handwriting acquisition, comprising an electronic pen and a tablet having a pressure-sensitive or induction-sensitive surface, and in which the movements of the pen or the pen tip, the movements of the pen or of the pen tip optionally being acquired by the pressure-sensitive or induction-sensitive surface of the tablet or by acceleration sensors or optical sensors.

The sensor data can then be wirelessly transmitted to a PC which can carry out handwriting acquisition on the basis of the received pen movement data.

However, known electronic pens are disadvantageous inter alia in that they are less robust than conventional non-electronic pens. In particular the electronic sensor technology of electronic pens may be delicate and easily damaged for example by drops or mechanical overloading. The problem addressed by the present disclosure is therefore that of improving an electronic pen, for example with respect to the mechanical robustness of the electronic pen, in a manner requiring as little mechanical outlay as possible.

BRIEF SUMMARY

Further advantages, features, and details of the invention can be gathered from the claims, the description of preferred embodiments below, as well as the drawings. The problem presented is solved by the present disclosure by an electronic pen comprising pen position recognition means, comprising at least one electrical voltage source, at least one digital control unit, a force transmission element, and at least one force sensor for measuring a writing pressure force, and by a method for preventing overloading of a force sensor for measuring a writing pressure force for an electronic pen.

An electronic pen according to an embodiment of the disclosure comprising pen position recognition means may for example comprise at least one electrical voltage source, at least one digital control unit, at least one force transmission element, e.g. a pen refill or a similar component for transmitting the writing pressure force and a force sensor or pressure sensor for measuring a/the writing pressure force.

A force sensor or pressure sensor of this kind may for example inter alia comprise a housing and a displaceable pin that protrudes out of the housing. In this case, the pin may for example be displaceably mounted, for example for the purpose of displacements along the longitudinal axis of the electronic pen or for displacements substantially in parallel with the longitudinal axis of the electronic pen. In this case, the displaceable pin may for example also protrude from a possible force sensor housing so as to be substantially perpendicular to a surface of said housing. A pin of the kind can also be referred to as a measuring pin. Said force transmission element mentioned by way of example, e.g. a pen refill, can in this case press against a possible measuring pin of the force sensor for example and displace the measuring pin or displace the measuring pin together with the force sensor.

In addition to a pen refill, for example a printed circuit board or a circuit board, or for example a pen tip of the electronic pen, or another component that is suitable for transmitting a pressure force to the force sensor, in particular for transmitting a writing pressure force, can also be understood to be a force transmission element. In this case, the force transmission element or the pen refill, by way of example, or the pen tip, by way of example, of the electronic pen may also comprise electronic components, for example electrically capacitive components.

In addition, the electronic pen may comprise at least one resilient means, it being possible for the at least one resilient means to be configured so as to be able to generate a force that opposes the pressure force acting on the at least one force sensor.

In this case the pressure force acting on the force sensor may be transmitted to the force sensor for example via a/the force transmission element, e.g. a/the pressure force, for example the force transmission element, e.g. a/the pen refill, transmitting a/the writing pressure force which acts on the pen tip, for example on the pen refill tip, to the force sensor when the electronic pen is used, for example when writing on a substrate.

In this case, the force transmission element, for example the pen refill, of the electronic pen may be displaceably mounted, e.g. displaceably mounted for the purpose of displacements along the longitudinal axis of the electronic pen or for displacements substantially in parallel with the longitudinal axis of the electronic pen.

The writing pressure force or the pressure force measured by the at least one force sensor can for example be understood to be an axial pressure force that the force transmission element, e.g. a pen refill, can exert on the force sensor, e.g. when writing on a writing substrate.

In other words, in this case the pressure force acting on the at least one force sensor can move for example because the force transmission element, e.g. the pen refill, of the electronic pen is displaced, e.g. along the longitudinal axis of the electronic pen or substantially in parallel with the longitudinal axis of the electronic pen, and presses directly or indirectly against the at least one force sensor, for example when the force transmission element or a writing substrate is pressed when writing using the electronic pen.

In this case, the at least one force sensor of the electronic pen may likewise be displaceable along the longitudinal axis of the electronic pen or displaceable substantially in parallel with the longitudinal axis of the electronic pen.

The at least one resilient means may be configured to limit or weaken or dampen or absorb the forces acting on the force sensor such that the maximum pressure force load of the at least one force sensor is not exceeded.

The electronic pen may furthermore comprise at least one stopping means, e.g. in the form of a stop, which may be configured to stop the force transmission element, e.g. the pen refill, after a specified displacement path of the force transmission element along the longitudinal axis of the electronic pen or substantially in parallel with the longitudinal axis of the electronic pen.

The optional stopping means or the optional stop for limiting the displaceability of the force transmission element, e.g. the pen refill, in particular for limiting the displaceability of the force transmission element towards the end of the pen that is opposite the pen tip, e.g. the pen refill tip, may be formed for example as a rib of the housing of the electronic pen.

The stopping means or the stop or the rib can thus limit the displacement of the force transmission element, e.g. the pen refill, along the longitudinal axis of the electronic pen or substantially in parallel with the longitudinal axis of the electronic pen.

At the same time, the stopping means or the stop or the rib can be designed such that displaceability of the force sensor along the longitudinal axis of the electronic pen or substantially in parallel with the longitudinal axis of the electronic pen is not limited or not restricted by said stopping means. In other words, the stopping means or the stop or the rib may be designed such that the possible length of the possible displacement path of the force sensor can be greater than the possible maximum length of the possible displacement path of the force transmission element, e.g. the pen refill.

Since for example the diameter of the force transmission element, e.g. the pen refill, may be greater than the average diameter of the force sensor, for example the stopping means or the stop may be formed as a rib inside the housing of the electronic pen, which rib is interrupted in the center thereof.

Alternatively or in addition, the stopping means may also be integrated in the force sensor and e.g. be portion of a/the force sensor housing. It is conceivable inter alia for example, that the housing of the force sensor and/or of the force transmission element may be designed such that the force transmission element, which can for example press against a possible measuring pin, by way of example, and displace said pin, may fit onto the force sensor housing or onto a portion of the force sensor housing that is not the measuring pin, and thus limit the possible maximum length of the possible displacement path of the force transmission element. In this case, the arrangement or the selection of the geometry and/or the selection of the wall thickness of an optional rib of this kind may take place for example on the basis of the geometry, e.g. the height or width, of the force sensor, and/or on the basis of a specified displacement path of the force transmission element, e.g. the pen refill.

If the force sensor is larger than the force transmission element, for example a setback in the diameter of the force transmission element at the end remote from the pen tip may offer a similar solution which limits the displacement path of the force transmission element, e.g. of the pen refill, in that for example only the portion of the force transmission element after the setback can plunge into the rib.

In this case, the displacement path, specified by way of example, of the force transmission element, e.g. of the pen refill, or the position of the at least one stopping means can be selected such that the pressure force acting on the at least one force sensor or the pressure force generated by the at least one resilient means is below the maximum pressure force load of the force sensor over the entire length of the displacement path.

The force that is generated by the at least one resilient means and opposes said pressure force acting on the at least one force sensor can be generated inter alia by means of the pressure force acting on the force sensor for example on account of a displacement of the force transmission element, e.g. the pen refill, deforming the resilient means, and said deformation generating a counterforce, e.g. a spring force, owing to the resiliency of the resilient means, which counterforce opposes the pressure force acting on the at least one force sensor.

When a pressure force, for example a writing pressure force, acts, the force transmission element, e.g. the pen refill, can be displaced further back/towards the resilient means, the greater said force is. Typically, writing pressure forces or pressing forces of approximately 2 to 3 N can be achieved, e.g. when writing. However, in exceptional cases, such as when the electronic pen strikes the ground after the pen is dropped, significantly greater forces may act on the force transmission element, e.g. the pen refill, or the force sensor.

Therefore, the electronic pen may comprise further force limitation means, for example said stopping means or said stop, in addition to the resilient means.

In the event of a high enough pressure force acting on the force transmission element, e.g. the pen refill, and a sufficiently great displacement of the force transmission element resulting therefrom, it is then possible for example for the force transmission element to be pressed against the stopping means, for example a stop or rib.

In this case, the electronic pen may be designed such that the force acting when the stopping means or the stop is reached may be for example between 5 and 50 N, in particular for example between 10 and 15 N.

An electronic pen according to the invention is advantageous for example in that, owing to the resiliency of the at least one resilient means, the pressure force acting on the at least one force sensor is proportional to the displacement thereof.

An electronic pen according to the invention can therefore weaken or dampen or absorb the forces acting on the force sensor such that the maximum pressure force load of the at least one force sensor is not exceeded.

In this case, the potentially possible displacement path of the force sensor can, or preferably should, be greater than the possible displacement path of the force transmission element, e.g. the pen refill, such that the force or pressure force acting on the force sensor can be limited, for example can be limited to a value which acts on the force sensor for example when the force transmission element, e.g. the pen refill, reaches the stopping means or reaches the stop.

In this case, for example the possible displacement path of the force sensor may be selected such that possible restrictions with respect to possible writing angles of the electronic pen can be prevented or minimized, and can be selected such that said deflection or suspension or damping of the force transmission element, e.g. the pen refill, is not irritating for the user.

For example, the electronic pen may be designed such that the possible displacement path of the force sensor may be for example between 0.2 and 0.5 mm.

This can improve the robustness and sensitivity of the electronic pen, since the at least one force sensor can thus be protected from damage by excessive pressure force loads, for example caused in the case of an electronic pen falling onto or striking a hard floor or in the event of improper use of the electronic pen.

Furthermore, the resilient means can be used, for example on account of a spring tension/the spring tension thereof, to bring about a preload of the unit or assembly comprising the force sensor and the force transmission element, e.g. the pen refill, such that the dimensions of manufacturing tolerances can be slightly adjusted, for example, without the force sensor and/or the force transmission element, e.g. the pen refill, from being too loose and rattling in the non-loaded electronic pen.

In this case, the at least one resilient means of the electronic pen may comprise a spring element, for example.

In this case, the spring element may be formed e.g. as a bending spring, for example as a leaf spring.

Other resilient means, e.g. leg springs, spiral springs or other resilient elements such as fluid-filled resilient cushions or resilient foams, or other designs of spring elements, such as torsion springs or disk springs are also conceivable, however.

The at least one resilient means of the electronic pen may be electrically conductive and a portion of the resilient means may function for example as a pole contact, e.g. as a negative pole contact, of the at least one electrical voltage source.

Likewise, a portion of the at least one force sensor, e.g. a portion of the electrical connecting cable of the at least one force sensor, may function as a pole contact, e.g. as a positive pole contact, of the at least one electrical voltage source.

This can for example save installation space and components and allow for a more compact and cost-effective structure of the electronic pen. The at least one force sensor of the electronic pen may be connected to the at least one voltage source and to the at least one resilient means, e.g. via at least one flexible electrical conductor.

In this case, a flexible electrical conductor may be understood for example as a flexible circuit board and/or a flexible electrical flat cable.

Furthermore, the at least one force sensor and the at least one voltage source may be displaceable together along the longitudinal axis of the electronic pen and displaceable individually or together substantially in parallel with the longitudinal axis of the electronic pen.

In this case, the joint displacement may take place counter to or in the direction of the at least one resilient means.

Displacements of the force sensor are also possible in the opposite direction, however, i.e. away from the resilient means. It is thus possible, inter alia, for example for the force sensor, optionally together with an optional second circuit board or auxiliary circuit board that is connected to the force sensor, to be pushed into a specified starting position when the voltage source is brought into operation.

In this case, using a flexible electrical conductor can facilitate the displacement of the force sensor and/or the displacement of the at least one voltage source along the longitudinal axis of the electronic pen or substantially in parallel with the longitudinal axis of the electronic pen.

The at least one resilient means of the electronic pen may furthermore be connected to a first circuit board or be arranged on a first circuit board.

Said first circuit board, given by way of example, may for example be a/the processor circuit board, on which e.g. at least one digital control unit, for example for evaluating the data of the at least one force sensor of the electronic pen, may be located.

The at least one force sensor of the electronic pen may furthermore be connected to a second circuit board or be arranged on a second circuit board.

Said second circuit board, given by way of example, may for example be a/the sensor circuit board which may be rigidly connected to the housing of the electronic pen and on which e.g. the position and movement determination sensor technology of the electronic pen may be located. As a result, for example the sensor technology can be attached close to the tip in order to be able to acquire the movements of the pen tip or pen refill tip particularly effectively.

As already mentioned, the at least one force sensor may in this case be connected to the at least one voltage source and to the at least one resilient means via at least one flexible electrical conductor.

Furthermore, for example the at least one force sensor may be connected to the second circuit board by means of a flexible branch of the at least one flexible electrical conductor.

Using a flexible branch of the at least one flexible electrical conductor for attachment to the at least one force sensor and/or for optional connection of the at least one force sensor to the optional second circuit board or auxiliary circuit board may allow inter alia for the at least one force sensor and/or the optional second circuit board or auxiliary circuit board to be able to be pivoted out of a specified plane of the at least one flexible electrical conductor and thus for example for the at least one force sensor or the contact surface of the at least one force sensor to be able to be arranged so as to be substantially perpendicular to the pen refill.

In this case, the at least one force sensor and the at least one voltage source and the second circuit board may in turn be displaceable together along the longitudinal axis of the electronic pen or displaceable together substantially in parallel with the longitudinal axis of the electronic pen.

In this case, the joint displacement may take place counter to or in the direction of the at least one resilient means.

An arrangement, by way of example, of this kind, i.e. an assembly that can be displaced together and that comprises at least one force sensor and at least one voltage source and a second circuit board that are interconnected by means of a flexible electrical conductor, the at least one force sensor being connected to the second circuit board by means of a flexible branch of the flexible electrical conductor, can likewise limit the absorption of the pressure force exerted on the force sensor, e.g. by the pen refill, for example by means of displacement against a stopping means, for example a stop.

As mentioned, the electronic pen may comprise at least one stopping means which may be configured to stop the force transmission element, e.g. the pen refill, after a specified displacement path of the force transmission element, e.g. the pen refill, along the longitudinal axis of the electronic pen or substantially in parallel with the longitudinal axis of the electronic pen.

In this case, the displacement path, specified by way of example, of the force transmission element, e.g. of the pen refill, or the position of the at least one stopping means can be selected such that the pressure force acting on the at least one force sensor or the pressure force generated by the at least one resilient means is below the maximum pressure force load of the force sensor over the entire length of the displacement path.

A method, by way of example, for preventing overloading of a force sensor for measuring a writing pressure force for an electronic pen, it being possible for the electronic pen to comprise at least one electrical voltage source, at least one digital control unit, a force transmission element, for example a pen refill, and at least one force sensor for measuring a writing pressure force, and at least one resilient means, and it being possible for the at least one resilient means to be configured to generate a force that opposes the pressure force acting on the at least one force sensor, may for example comprise the following steps:

displacing the force transmission element, e.g. the pen refill, along the longitudinal axis of the electronic pen or displacing the force transmission element substantially in parallel with the longitudinal axis of the electronic pen in order to exert a pressure force on the at least one force sensor and in order to displace the at least one force sensor along the longitudinal axis of the electronic pen or substantially in parallel with the longitudinal axis of the electronic pen towards the at least one resilient means and counter to the force that can be generated by the at least one resilient means, e.g. a spring force, and damping the pressure force exerted on the at least one force sensor by said displacement of the force transmission element, e.g. the pen refill, using the at least one resilient means, i.e. by limiting the displacement path of the force transmission element or by means of the force, e.g. spring force, generated by the resilient means owing to the deformation or compression thereof, which force opposes the pressure force exerted on the at least one force sensor due to the displacement of the force transmission element, e.g. the pen refill.

In this case, for example the length of the displacement path of the force transmission element, e.g. of the pen refill, along the longitudinal axis of the electronic pen or substantially in parallel with the longitudinal axis of the electronic pen towards the at least one resilient means can be selected or specified such that the pressure force acting on the at least one force sensor or for example the force, e.g. spring force, generated by the at least one resilient means may be below the maximum pressure force load of the force sensor over the entire length of the displacement path.

It is furthermore possible for the displacement movement of the force transmission element, e.g. of the pen refill, to be stopped or limited by at least one stopping means, for example after a displacement path of the force transmission element, e.g. of the pen refill, along the longitudinal axis of the electronic pen or substantially in parallel with the longitudinal axis of the electronic pen towards the at least one resilient means, the pressure force acting on the at least one force sensor being below the maximum pressure force load of the force sensor over the entire length of the displacement path.

As already mentioned, the force sensor may furthermore comprise a displaceably mounted measuring pin which is for example designed for displacement along the longitudinal axis of the electronic pen or for displacement substantially in parallel with the longitudinal axis of the electronic pen.

Said force transmission element mentioned by way of example, e.g. a pen refill, can in this case for example press against said possible measuring pin, by way of example, of the force sensor and displace the measuring pin, and in the process for example press the measuring pin into the force sensor housing at least in part or displace the measuring pin together with the force sensor. The optional stopping means or the optional stop for limiting the displaceability of the force transmission element, e.g. the pen refill, in particular for limiting the displaceability of the force transmission element towards the end of the pen that is opposite the pen tip may, as mentioned, be formed for example as a rib of the housing of the electronic pen.

The stopping means or the stop or the rib can thus limit the displacement of the force transmission element, e.g. the pen refill, along the longitudinal axis of the electronic pen or substantially in parallel with the longitudinal axis of the electronic pen, but without restricting the displaceability of the force sensor in the process.

In this case, the arrangement or the selection of the geometry and/or the selection of the wall thickness of an optional rib of this kind may, as mentioned above, take place for example on the basis of the geometry, e.g. the height or width, of the force sensor, and/or on the basis of a specified displacement path of the force transmission element, e.g. the pen refill.

For example, the wall thickness of the optional rib may be approximately equal to the height or length of the force sensor, minus a desired specified displacement path of the force transmission element, e.g. the pen refill.

As also already mentioned, alternatively or in addition the force sensor may itself function as or be designed as a stopping means.

It is conceivable inter alia for example, that the housing of the force sensor and/or of the force transmission element may be designed such that the force transmission element, which can for example press against a possible measuring pin, by way of example, and displace said pin, may fit onto a portion of the force sensor housing that is not the measuring pin, and thus limit the possible maximum length of the possible displacement path of the force transmission element.

The at least one force sensor of the electronic pen can thus be protected from damage due to excessive pressure force loading, e.g. owing to falls or improper use.

BRIEF DESCRIPTION OF THE DRAWINGS

In the following drawings, by way of example:

FIG. 4a: is a schematic view, by way of an embodiment, of an electronic pen according to the invention in a first state.

FIG. 4b: is a schematic view, by way of an embodiment, of an electronic pen according to the invention in a second state.

DETAILED DESCRIPTION

Figure 1:
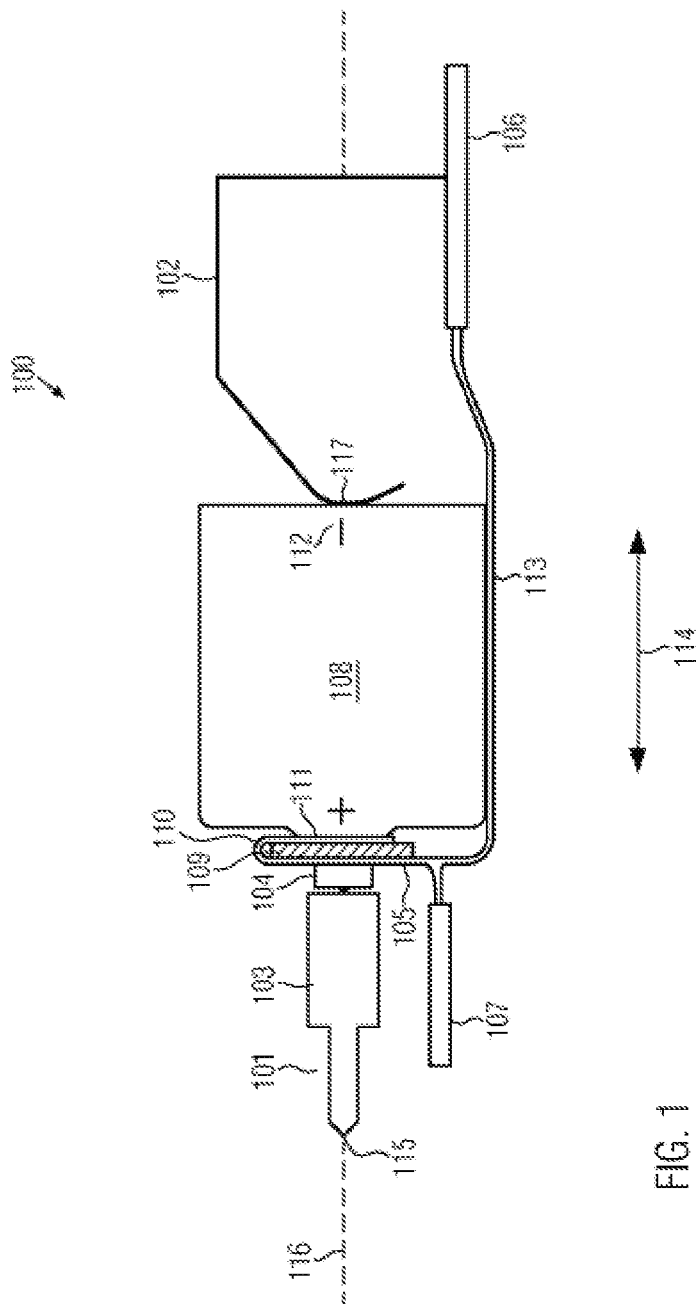
FIG. 1: is a schematic view, by way of an embodiment, of some possible components of an electronic pen according to the invention.

The features and combinations of features referred to above in the description and the features and combinations of features referred to in the following description of the drawings and/or shown solely in the drawings are useable not only in each of the combinations described but also in other combinations or in isolation without exceeding the scope of the invention. Therefore, embodiments and combinations of features, which do not contain all the features of the originally worded independent claim, are also to be considered disclosed. In addition, embodiments and combinations of features which exceed or deviate from the combinations of features referred to in the dependency references of the claims, are also to be considered disclosed, particularly by the above described embodiments.

Further advantages, features, and details of the invention can be derived from the claims, the following description of preferred embodiments, and from the drawings.

FIG. 1 is a schematic view, by way of example, of some possible components 100 of an electronic pen according to the invention, which pen may comprise at least one force sensor 104 for measuring a writing pressure force.

In this case, the electronic pen may comprise a pen refill 101 that functions as a force transmission element, e.g. comprising a pen refill tip 115 and a pen refill cartridge 103 by way of example.

As mentioned above, the force transmission element 101 by way of example for transmitting a/the writing pressure force may also be designed for example as a printed circuit board or circuit board, or as another component that is suitable for transmitting a pressure force, in particular a writing pressure force.

In this case, the electronic pen may comprise a voltage source 108 which may be installed in the housing (not shown) of the electronic pen together with a resilient means 102, e.g. an electrically conductive spring element, for example a leaf spring.

In this case, reference signs 111 and 112 denote for example the positive pole 111 and the negative pole 112 of the voltage source 108.

The electronic components, i.e. for example the voltage source 108, the first circuit board, e.g. main circuit board or processor circuit board 106, the optional second circuit board, e.g. auxiliary circuit board or sensor circuit board 107, and the force sensor 104 may be interconnected by means of the at least one flexible electrical conductor 113, e.g. a flexible electrical flat cable.

In this case, the resilient means 102 may be electrically conductive and may function, for example via the contact surface 117 of the resilient means, as a pole contact, e.g. as a negative pole contact, for the at least one electrical voltage source 108.

It is thus possible for example to omit an additional separate cable to the negative pole 112.

Likewise, a portion of the force sensor 104, e.g. a portion 110 or an extension of the flexible branch 105 of the at least one flexible electrical conductor 113 may come into contact with a pole of the voltage source, e.g. the positive pole 111 of the voltage source, and function as a pole contact or positive pole contact.

In this case, said portion 110 of the flexible branch 105 of the at least one flexible electrical conductor 113 may for example be wrapped around an optional reinforcing element 109 given by way of example. Said optional reinforcing element 109 may comprise e.g. a glass fiber/epoxy plate and be used for reinforcing the flexible electrical conductor 113, in particular in the region of soldered elements.

Said arrangement by way of example can save installation space, keep the number of parts low, and allow for a more compact structure of the electronic pen.

Furthermore, the at least one force sensor 104 and the at least one voltage source 108 may be displaceable together along the longitudinal axis 116 of the electronic pen or displaceable together substantially in parallel with the longitudinal axis 116 of the electronic pen.

For example, a displacement of the pen refill 101, which refill may rest on the force sensor 104, can exert a pressure force on the force sensor 104 and thus bring about a displacement of the force sensor 104 or a joint displacement of the force sensor 104 and the voltage source 108 towards the resilient means 102.

In this case, reference sign 114 denotes for example possible displacement path directions of the force sensor 104 and/or of the voltage source 108 and/or of other possible displaceable components, e.g. the auxiliary circuit board or the sensor circuit board 107, along the longitudinal axis 116 of the electronic pen or substantially in parallel with the longitudinal axis 116 of the electronic pen.

In other words, in this case the joint displacement, by way of example, of the force sensor 104 and the voltage source 108 can take place counter to the at least one resilient means 102 and can deform or compress the resilient means 102 and thus generate a counterforce that opposes a pressure force, e.g. a writing pressure force, acting on the force sensor 104.

It is also possible for the optional second circuit board or sensor circuit board 107 to be displaceable along the longitudinal axis 116 of the electronic pen or displaceable substantially in parallel with the longitudinal axis 116 of the electronic pen, i.e. for example to also be displaceable together with the force sensor 104.

In this case, using the flexible electrical conductor 113, given by way of example, can facilitate the displacement of the force sensor 104 and/or the displacement of the sensor circuit board 107 and/or the displacement of the at least one voltage source 108 along the longitudinal axis of the electronic pen or substantially in parallel with the longitudinal axis 116 of the electronic pen.

The at least one resilient means 102 of the electronic pen may be connected to the first circuit board 106, e.g. rigidly soldered to the first circuit board 106, or be arranged on a first circuit board 106. In addition, said resilient means may be retained in the housing of the pen and restricted in its movement by means of optional projections.

Said first circuit board 106, given by way of example, may for example be the main circuit board or processor circuit board which may be rigidly connected to the housing (not shown) of the electronic pen and on which e.g. the at least one digital control unit (not shown) of the electronic pen may be located and on which e.g. further measuring sensors and evaluation sensors, for example for evaluating the data of the at least one force sensor 104 of the electronic pen, for example an analogue-to-digital converter for the force sensor data, may be located.

The at least one force sensor 104 of the electronic pen may furthermore be connected to a/the optional second circuit board 107 or be arranged on a/the second circuit board.

Said second circuit board 107, given by way of example, may for example be the secondary circuit board or sensor circuit board on which e.g. the position and movement determination sensor technology of the electronic pen may be located. As a result, for example the sensor technology can be attached close to the tip in order to be able to acquire the movements of the pen tip particularly effectively.

As already mentioned, the force sensor 104 may in this case be connected to the voltage source 108 and to the resilient means 102 via flexible electrical conductor 113.

Furthermore, for example the force sensor 104 may be connected to the second circuit board 107 by means of a flexible branch 105 of the flexible electrical conductor.

Using a flexible branch 105 of the flexible electrical conductor 113 for attachment to the at least one force sensor 104 and/or for optional connection of the at least one force sensor 104 to the optional second circuit board 107 or auxiliary circuit board may allow inter alia for the at least one force sensor 104 and/or the optional second circuit board 107 or auxiliary circuit board to be able to be pivoted out of a specified plane of the flexible electrical conductor and thus for example for the at least one force sensor 104 or the contact surface of the at least one force sensor to be able to be arranged so as to be substantially perpendicular to the pen refill 101.

If for example the force transmission element or the pen refill 101 is then displaced along the longitudinal axis of the electronic pen or is displaced substantially in parallel with the longitudinal axis 116 of the electronic pen refill, towards the at least one resilient means 102, for example by means of the pressure forces arising when writing on a writing substrate (not shown) using the pen, in the arrangement by way of example that is shown, the pen refill 101 thus displaces the force sensor 104 and the voltage source 108 simultaneously, counter to the resilient means 102, the resilient means 102 in addition being able to also function as a pole contact 117, e.g. as a negative pole contact.

In this case, for example the length of the displacement path of the force transmission element or the pen refill 101 along the longitudinal axis 116 of the electronic pen or substantially in parallel with the longitudinal axis of the electronic pen towards the at least one resilient means 102 can be selected or specified such that the pressure force acting on the at least one force sensor 104 or for example the force, e.g. spring force, generated by the at least one resilient means 102, which force opposes the writing pressure force of the pen refill 101, which force is caused e.g. by writing on a writing substrate, may be below the maximum pressure force load of the force sensor 104 over the entire length of the displacement path.

It is furthermore possible for the displacement movement of the pen refill to be stopped by at least one stopping means (not shown), for example after a displacement path of this kind of the force transmission element, or of the pen refill 101 along the longitudinal axis 116 of the electronic pen or substantially in parallel with the longitudinal axis 116 of the electronic pen towards the at least one resilient means, it being possible for the pressure force acting on the at least one force sensor 104 to be below the maximum pressure force load of the force sensor over the entire length of the displacement path.

Figure 2:
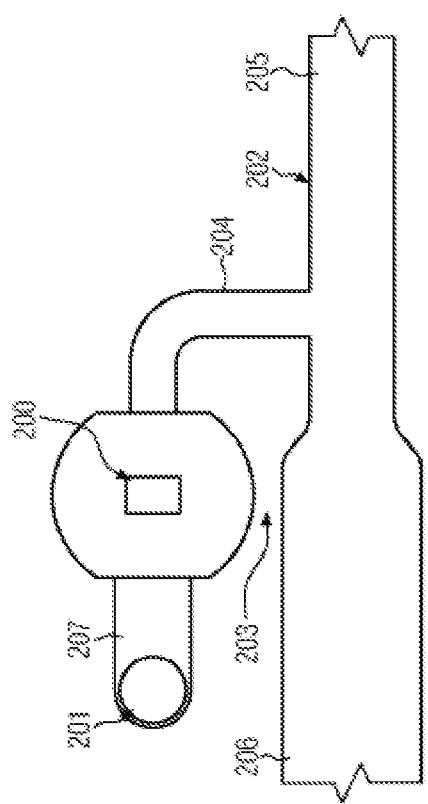
FIG. 2: is an interconnection diagram, given by way of an embodiment.

FIG. 2 is an interconnection diagram, given by way of example, of the at least one force sensor 200 to other components of an electronic pen by way of example.

In this case, the force sensor 200 is shown, by way of example, as a force sensor disk.

In this case, the force sensor, given by way of example, is connected, for example by means of a flexible branch 204, to a flexible electrical conductor 202, given by way of example, it being possible for the flexible electrical conductor 202 for example to comprise a portion 205 which can lead to a first circuit board (not shown), e.g. a main circuit board, which accommodates a digital control unit of the electronic pen for example, and to at least one resilient means (not shown), and can also lead to a possible second circuit board 206, e.g. auxiliary circuit board.

Furthermore, an extension 207, by way of example, of the flexible branch 204 of the at least one flexible electrical conductor 202 of the electronic pen (not shown) can establish a pole contact 201, e.g. a positive pole contact, between the voltage source and the force sensor.

Furthermore, a gap 203, by way of example, may be provided between the possible second circuit board 206, e.g. auxiliary circuit board, and the force sensor 200, which gap may be minimal for example.

As mentioned, the flexible conductor 202, by way of example, and the portions or extensions and/or branches thereof, and the force sensor 200 and the circuit board 206 may be configured such that said components may be displaceable together along the longitudinal axis of the electronic pen (not shown) or substantially in parallel with the longitudinal axis of the electronic pen (not shown), counter to the voltage source of the electronic pen (not shown), and may be displaceable, together with the voltage source, towards the at least one resilient means of the electronic pen (not shown).

Figure 3:
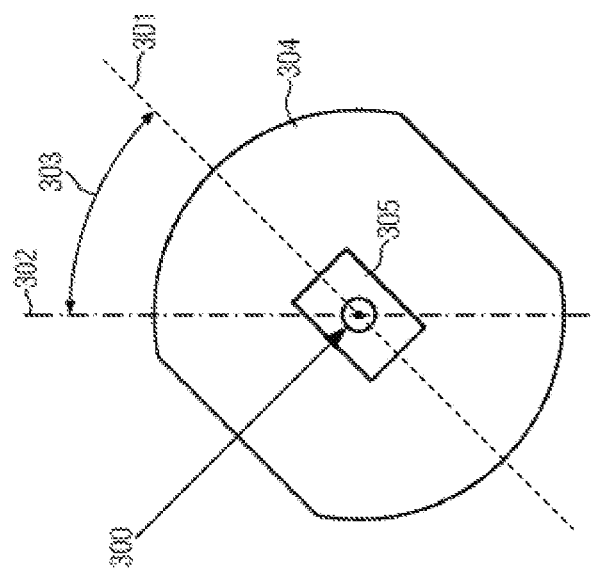
FIG. 3: shows the installation angle, by way of an embodiment, of the force sensor.

FIG. 3 shows the rotational angle or installation angle 303, by way of example, of the force sensor 304 relative to a separating plane 303, by way of example, of the housing of the electronic pen (not shown).

In this case, the contact surface 305 of the force sensor 304 may for example be substantially perpendicular to the pen refill or perpendicular to the longitudinal axis 300 of the electronic pen, and the installation angle 303 may be specified for example as the angle between the longitudinal axis 300, by way of example, of the force sensor and the separating plane 302 of the housing of the electronic pen.

In this case, the installation angle 303 (e.g. as set out, the angle between the separating plane 302, by way of example, and the longitudinal axis 301, by way of example, of the force sensor 304) may be non-zero, i.e. the force sensor may be installed so as to be rotated, it being possible for the value of the installation angle 303 to be dependent for example on the length of the connection of the flexible conductor (not shown) which can connect the force sensor 304 to other components of the electronic pen (see e.g. FIG. 2 and FIG. 1), or on the length of a flexible branch of the flexible conductor.

A force sensor or pressure sensor 304 of this kind may for example inter alia also comprise a housing and a displaceable pin (not shown) that protrudes out of the housing. In this case, the pin may for example be displaceably mounted, for example for the purpose of displacements along the longitudinal axis of the electronic pen or for displacements substantially in parallel with the longitudinal axis of the electronic pen. In this case, the displaceable pin may for example also protrude from a possible force sensor housing so as to be substantially perpendicular to a surface of said housing. A pin of the kind can also be referred to as a measuring pin. Said force transmission element mentioned by way of example, e.g. a pen refill, can in this case press against a possible measuring pin of the force sensor for example and displace the measuring pin or displace the measuring pin together with the force sensor.

FIG. 4a is a schematic view, by way of example, of an electronic pen 400 according to the invention, which pen may comprise an electrical voltage source 408, a digital control unit (not shown), a pen refill 401, and a force sensor 404 for measuring a writing pressure force.

The force transmission element 401 may be formed as a pen refill for example, it being possible in this case for the pen refill by way of example to also comprise a pen refill cartridge 403 by way of example in addition to a pen refill tip 415 by way of example.

Furthermore, the pen 400 comprises a resilient means 402 by way of example, e.g. a bending spring, which may be configured to be able to generate a force that opposes the pressure force acting on the force sensor 404.

Analogously to the view, by way of example, in FIG. 1, in this case, reference signs 411 and 412 denote for example the positive pole 411 and the negative pole 412 of the voltage source 408.

The electronic components, i.e. for example the voltage source 408, the first circuit board, e.g. main circuit board 406 or processor circuit board, the second circuit board, e.g. sensor circuit board 407, and the force sensor 404 may be interconnected by means of a flexible electrical conductor 413, e.g. a flexible electrical flat cable.

In this case, the resilient means 402 may be electrically conductive and may function, for example via the contact surface 417 of the resilient means, as a pole contact, e.g. as a negative pole contact, for the at least one electrical voltage source 408. It is thus possible for example to omit an additional separate cable to the negative pole 412.

Likewise, a portion of the force sensor 404, e.g. a portion 410 or an extension of the flexible branch 405 of the at least one flexible electrical conductor 413 may come into contact with a pole of the voltage source, e.g. the positive pole 411 of the voltage source, and function as a pole contact or positive pole contact.

In this case, said portion 410 of the flexible branch 405 of the at least one flexible electrical conductor 413 may for example be wrapped around an optional reinforcing element 409 given by way of example. Said optional reinforcing element 409 may comprise e.g. a glass fiber/epoxy plate and be used inter alia for reinforcing the flexible electrical conductor 413, in particular in the region of soldered elements.

Said arrangement by way of example can save installation space and allow for a more compact structure of the electronic pen.

Furthermore, the force transmission element, e.g. the pen refill 401, the at least one force sensor 404 and the at least one voltage source 408 may be displaceable individually or together along the longitudinal axis 416 of the electronic pen or displaceable individually or together substantially in parallel with the longitudinal axis 416 of the electronic pen.

For example, a displacement of the force transmission element, e.g. the pen refill 401, which element may rest on the force sensor 404, can exert a pressure force on the force sensor 404 and thus bring about a displacement of the force sensor 404 or a joint displacement of the force sensor 404 and the voltage source 408 towards the resilient means 402.

In this case, reference sign 414 denotes for example possible displacement path directions of the force transmission element or pen refill 401 and/or of the force sensor 404 and/or of the voltage source 408 and/or of other possible displaceable components, e.g. the second circuit board 407, along the longitudinal axis 416 of the electronic pen or substantially in parallel with the longitudinal axis 416 of the electronic pen.

In other words, in this case the joint displacement, by way of example, of the force sensor 404 and the voltage source 408 can take place counter to the at least one resilient means 402 and can deform or compress the resilient means 402 and thus generate a counterforce that opposes a pressure force, e.g. a writing pressure force, acting on the force sensor 404.

It is also possible for the second circuit board or sensor circuit board 407 to be displaceable along the longitudinal axis 416 of the electronic pen or displaceable substantially in parallel with the longitudinal axis 416 of the electronic pen, i.e. for example to also be displaceable together with the force sensor 404.

In this case, using the flexible electrical conductor 413, given by way of example, can facilitate the displacement of the force sensor 404 and/or the displacement of the sensor circuit board 407 and/or the displacement of the at least one voltage source 408 along the longitudinal axis of the electronic pen or substantially in parallel with the longitudinal axis 416 of the electronic pen.

The at least one resilient means 402 of the electronic pen may be connected to the first circuit board 406, e.g. rigidly soldered to the first circuit board 406, or be arranged on a first circuit board 406. In addition, the resilient element may be retained in the housing of the pen and restricted in its movement by means of optional retaining means, such as projections 419.

The first circuit board 406, given by way of example, may for example be the main circuit board or processor circuit board which may be rigidly connected to the housing 426 and/or to the end 420 of the electronic pen 400 opposite the pen tip, e.g. the pen refill tip, and on which e.g. the at least one digital control unit (not shown) of the electronic pen 400 may be located and on which for example evaluation sensors, for example for evaluating the data of the at least one force sensor 404 of the electronic pen, for example an analogue-to-digital converter for the force sensor data, may be located.

The at least one force sensor 404 of the electronic pen 400 may furthermore be connected to a/the optional second circuit board 407 or be arranged on a/the second circuit board.

Said second circuit board 407, given by way of example, may for example be the secondary circuit board or sensor circuit board on which e.g. the position and movement determination sensor technology of the electronic pen may be located. As a result, for example the sensor technology can be attached close to the tip in order to be able to acquire the movements of the pen tip particularly effectively.

As already mentioned, the force sensor 404 may in this case be connected to the voltage source 408 and to the resilient means 402 via flexible electrical conductor 413.

Furthermore, for example the force sensor 404 may be connected to the second circuit board 407 by means of a flexible branch 405 of the flexible electrical conductor.

Using a flexible branch 405 of the flexible electrical conductor 413 for attachment to the at least one force sensor 404 and/or for optional connection of the at least one force sensor 404 to the optional second circuit board 407 or auxiliary circuit board may allow inter alia for the at least one force sensor 404 and/or the optional second circuit board 407 or auxiliary circuit board to be able to be pivoted out of a specified plane of the flexible electrical conductor and thus for example for the at least one force sensor 404 or the contact surface of the at least one force sensor to be able to be arranged so as to be substantially perpendicular to the force transmission element or perpendicular to the pen refill 401.

If for example the force transmission element, e.g. the pen refill 401, is then displaced along the longitudinal axis of the electronic pen or is displaced substantially in parallel with the longitudinal axis 416 of the electronic pen refill, towards the at least one resilient means 402, for example by means of the pressure forces arising when writing on a writing substrate (not shown) using the pen, in the arrangement by way of example that is shown, the force transmission element or the pen refill 401 thus displaces the force sensor 404 and the voltage source 408 simultaneously, counter to the resilient means 402, the resilient means 402 in addition being able to also function as a pole contact 417, e.g. as a negative pole contact.

In this case, for example the length of the displacement path of the force transmission element or the pen refill 401 along the longitudinal axis 416 of the electronic pen 400 or substantially in parallel with the longitudinal axis 416 of the electronic pen 400 towards the at least one resilient means 402 can be selected or specified such that the pressure force acting on the at least one force sensor 404 or for example the force, e.g. spring force, generated by the at least one resilient means 402, which force opposes the writing pressure force of the pen refill 401, which force is caused e.g. by writing on a writing substrate, may be below the maximum pressure force load of the force sensor 404 over the entire length of the displacement path.

In the view by way of example shown in FIG. 4*a*, the pen 400 is in this case in a first state, by way of example, in which for example the pen 400 is not loaded, i.e. the force sensor 404 not being loaded, i.e. no or only a minimal force bearing on the force sensor 404, or e.g. no pressure force resulting from use of the pen bearing on the force transmission element or on the pen refill 401 or on the force sensor 404.

The first state, by way of example, of the pen 400 may for example be described by a first position 422 of the force transmission element or of the pen refill 401. In this case, as shown the pen refill 401 may for example be located in the position 422, shown by way of example, in which the pen refill 401 or the pen cartridge 403 rests on the force sensor 404 without exerting a force or pressure force on the force sensor 404 in the process or without exerting a force or pressure force on the force sensor 404 that would significantly load or that would displace the force sensor 404.

In the non-loaded state, by way of example, of the pen 400 the resilient means 402 may in addition likewise be in a first state, e.g. an initial state or initial shape 424.

If a pressure is exerted on the force transmission element, e.g. the pen refill 401, or on the pen tip, e.g. pen refill tip 415, the force transmission element, e.g. the pen refill 401, may be displaced along the longitudinal axis 416 of the electronic pen or substantially in parallel with the longitudinal axis 416 of the electronic pen towards the at least one resilient means 402, it being possible for the pressure force acting on the at least one force sensor 404 to be below the maximum pressure force load of the force sensor over the entire length of the displacement path.

The displacement movement of the force transmission element or of the pen refill 401 may furthermore be stopped or limited by at least one stopping means, for example by a stop or by a rib 418. In this case, the optional stopping means or the optional rib 418 may be integrated in the housing 426 of the electronic pen 400.

In this case, the optional stopping means 418 may be arranged such that the spacing 421, by way of example, between the force transmission element or pen refill 401 or pen refill cartridge 403 and the stopping means 418 specifies a (maximum) displacement path by way of example.

The stopping means or the stop or the rib 418 can thus limit the possible displacement of the force transmission element or the pen refill 401 along the longitudinal axis 416 of the electronic pen or substantially in parallel with the longitudinal axis of the electronic pen.

At the same time, the stopping means or the stop or the rib 418 can be designed such that displaceability of the force sensor 404 along the longitudinal axis 416 of the electronic pen or substantially in parallel with the longitudinal axis of the electronic pen is not limited or not restricted.

Since for example the diameter of the force transmission element or the pen refill 401 or the pen cartridge 403 may be greater than the average diameter of the force sensor, for example the stopping means or the stop 418 may be formed as a rib inside the housing 426 of the electronic pen 400, which rib is interrupted in the center thereof.

In this case, the arrangement or the selection of the geometry and/or the selection of the wall thickness of an optional rib 418 of this kind may take place for example on the basis of the geometry, e.g. the height or width, of the force sensor 404, and/or on the basis of a specified displacement path of the force transmission element or the pen refill 401.

For example, the wall thickness of the optional rib 418 may be approximately equal to the height or length of the force sensor 404, minus a desired specified displacement path of the force transmission element or the pen refill 401.

In this case, the force sensor 404 may be thicker than the stopping means/thicker than the rib 418 by the (maximum) displacement path 421, by way of example, of the force transmission element or of the pen refill, such that for example the force sensor 404 and the force transmission element or the pen refill 401 may be freely displaceable along or substantially in parallel with the longitudinal axis 416 of the pen when low forces act on the force transmission element or on the pen refill 401, and the force transmission element or the pen refill 401 may be able to be pressed against the stop 418, in order to be able to limit the force acting on the force sensor 404, when a higher force acts on the force transmission element or on the pen refill or pen tip or pen refill tip 415.

FIG. 4*b* shows, by way of example, a pen 400 that is similar or identical to the pen of FIG. 4*a*.

In contrast with FIG. 4*a*, however, in this case the pen 400 is shown in a loaded state, i.e. in a state where a force is exerted on the force transmission element or on the pen refill 401, which force has displaced the force transmission element or the pen refill 401, together with the force sensor 404 and the voltage source, towards the resilient means 402, and has brought the resilient means 402 into a state having a different shape 425 or a deformation compared with a non-loaded shape.

Owing to the resiliency of the resilient means, said deformation 425, by way of example, of the resilient means can generate a counterforce, e.g. a spring force, which opposes the pressure force acting on the at least one force sensor.

The loaded state of the pen, shown by way of example, which is characterized inter alia by the position 423 of the force transmission element or of the pen refill 401, furthermore shows, by way of example, the case in which the force exerted on the force transmission element or on the pen refill 401 is sufficiently high to press the force transmission element or the pen refill 401 or the pen cartridge against the possible stopping means 418.

In other words, in the case shown the force transmission element or the pen refill 401 has been displaced a maximum amount along the longitudinal axis of the pen and the stopping means 418 can, in addition to the resilient means 402, further contribute to limiting the force acting on the force sensor 404, in order for it to be possible to protect the force sensor 404 from overloading.

REFERENCE SIGNS 100 components, by way of example, of an electronic pen according to the invention
101 force transmission element by way of example, e.g. pen refill
102 resilient means by way of example, e.g. spring element, for example leaf spring
103 pen refill cartridge by way of example
104 force sensor by way of example
105 flexible branch, by way of example, of the at least one flexible electrical conductor 113
106 (first) circuit board by way of example, e.g. main circuit board or processor circuit board
107 (second) circuit board by way of example, e.g. auxiliary circuit board or sensor circuit board for position determination sensors
108 voltage source by way of example, e.g. battery
109 optional reinforcing element by way of example
110 pole contact by way of example, e.g. positive pole contact, between the voltage source and the force sensor, or portion, by way of example, of the flexible branch of the at least one flexible electrical conductor in contact with a pole of the voltage source, e.g. the positive pole of the voltage source
111 positive pole, by way of example, of the voltage source
112 negative pole, by way of example, of the voltage source
113 flexible electrical conductor by way of example
114 displacement movement by way of example
115 pen tip by way of example, e.g. pen refill tip
116 longitudinal axis, by way of example, of the electronic pen
117 pole contact by way of example, e.g. negative pole contact, between the resilient means and the voltage source or contact surface, by way of example, of the resilient means, which functions as a pole contact, e.g. as a negative pole contact, to the at least one electrical voltage source
200 force sensor by way of example, e.g. designed as a force sensor disk
201 pole contact, by way of example, between the voltage source and the force sensor, e.g. positive pole contact
202 flexible electrical conductor by way of example
203 gap, by way of example, between the possible second circuit board, e.g. auxiliary circuit board, and the force sensor
204 flexible branch, by way of example, of the flexible electrical conductor
205 portion, by way of example, of the flexible electrical conductor that leads to the first circuit board by way of example, e.g. main circuit board (not shown), and to the at least one resilient element (not shown).
206 possible second circuit board by way of example, e.g. auxiliary circuit board
207 extension, by way of example of the flexible branch of the at least one flexible electrical conductor for establishing a pole contact, by way of example, between the voltage source and the force sensor, e.g. a positive pole contact
300 longitudinal axis, by way of example, of an electronic pen by way of example
301 longitudinal axis, by way of example, of the force sensors
302 separating plane, by way of example, of the housing of the electronic pen by way of example
303 angle, by way of example, between the longitudinal axis of the force sensor and the separating plane 302
304 force sensor by way of example
305 force sensor contact surface by way of example
400 electronic pen by way of example
401 force transmission element by way of example, pen refill by way of example
402 resilient means by way of example
403 pen refill cartridge by way of example
404 force sensor by way of example
405 flexible branch, by way of example, of the at least one flexible electrical conductor 413
406 (first) circuit board by way of example, e.g. main circuit board or processor circuit board
407 (second) circuit board by way of example, e.g. auxiliary circuit board or sensor circuit board for position determination sensors
408 voltage source by way of example, e.g. battery
409 optional reinforcing element by way of example
410 pole contact by way of example, e.g. positive pole contact, between the voltage source and the force sensor, or portion, by way of example, of the flexible branch of the at least one flexible electrical conductor in contact with a pole of the voltage source, e.g. the positive pole of the voltage source
411 positive pole, by way of example, of the voltage source
412 negative pole, by way of example, of the voltage source
413 flexible electrical conductor by way of example
414 displacement movement by way of example
415 pen tip by way of example, e.g. pen refill tip
416 longitudinal axis, by way of example, of the electronic pen
417 pole contact by way of example, e.g. negative pole contact, between the resilient means and the voltage source or contact surface, by way of example, of the resilient means, which functions as a pole contact, e.g. as a negative pole contact, to the at least one electrical voltage source
418 rib, by way of example, as the stopping means or as the displacement path limitation means
419 further optional rib or optional rods or optional projections, by way of example, for retaining the resilient means
420 end of the pen, by way of example, opposite the pen tip, e.g. the pen refill tip
421 spacing, by way of example, between the force transmission element, e.g. pen refill or pen refill cartridge, and possible stopping means, (maximum) displacement path by way of example
422 first position, by way of example, of the force transmission element or of the pen refill or of the pen refill cartridge, position, by way of example, of the force transmission element or of the pen refill in the non-loaded state of the pen, i.e. for example when no force/pressure force is exerted on the force sensor by means of the force transmission element/by means of the pen refill.
423 second position, by way of example, of the force transmission element or of the pen refill or of the pen refill cartridge, position, by way of example, of the force transmission element or of the pen refill in the loaded state of the pen, i.e. for example when a force/pressure force is exerted on the force sensor by means of the force transmission element/by means of the pen refill, for example a force which presses the force transmission element or the pen refill against a stopping means.

424 first state, by way of example, of the resilient means, state, by way of example, of the resilient means in the non-loaded state, by way of example, of the pen 425 second state, by way of example, of the resilient means, state, by way of example, of the resilient means in the loaded state, by way of example, of the pen, deformation, by way of example, of the resilient means 426 housing, by way of example, of the electronic pen

What is claimed is:

1. An electronic pen comprising:
a pen position recognition system comprising
at least one electrical voltage source,
at least one digital control unit,
a force transmission element,
at least one force sensor for measuring a writing pressure force, and
at least one resilient member configured to generate a force that opposes the writing pressure force acting on the at least one force sensor,
wherein the at least one resilient member is electrically conductive and a portion of the at least one resilient member is configured to be a pole contact to the at least one electrical voltage source.

2. The electronic pen according to claim 1, wherein the at least one resilient member comprises a spring element.

3. The electronic pen according to claim 2, wherein the spring element is formed as a bending spring.

4. The electronic pen according to claim 1, wherein the at least one force sensor is displaceable along a longitudinal axis of the electronic pen or displaceable substantially in parallel with the longitudinal axis of the electronic pen.

5. The electronic pen according to claim 1, wherein a portion of the at least one force sensor is configured to be a pole contact to the at least one electrical voltage source.

6. The electronic pen according to claim 1, wherein the at least one force sensor is connected to the at least one voltage source and to the at least one resilient member via at least one flexible electrical conductor, and the at least one force sensor and the at least one voltage source are configured to be displaceable together along a longitudinal axis of the electronic pen or displaceable together substantially in parallel with the longitudinal axis of the electronic pen.

7. The electronic pen according to claim 1, wherein the at least one resilient member is connected to a first circuit board.

8. The electronic pen according to claim 1, wherein the at least one force sensor is connected to a second circuit board.

9. The electronic pen according to claim 8, wherein the at least one force sensor is connected to the at least one voltage source and to the at least one resilient member via at least one flexible electrical conductor, and the at least one force sensor is connected to the second circuit board by a flexible branch of the at least one flexible electrical conductor.

10. The electronic pen according to either claim 8 or claim 9, wherein the at least one force sensor, the at least one voltage source, and the second circuit board are displaceable together along the longitudinal axis of the electronic pen or displaceable together substantially in parallel with the longitudinal axis of the electronic pen.

11. The electronic pen according to claim 1, wherein the force transmission element is a pen refill.

12. The electronic pen according to claim 4, wherein the electronic pen comprises at least one stopping member configured to stop the force transmission element after a specified displacement path of the force transmission element along the longitudinal axis of the electronic pen or substantially in parallel with the longitudinal axis of the electronic pen.

13. A method for preventing overloading of a force sensor for measuring a writing pressure force for an electronic pen, comprising
providing an electric pen comprising
at least one electrical voltage source,
at least one digital control unit,
a longitudinal axis,
a force transmission element configured to be displaced along, or substantially in parallel with, the longitudinal axis,
at least one force sensor for measuring a writing pressure force, and
at least one resilient member
applying a pressure force to the at least one force sensor by displacing of the force transmission element along, or substantially in parallel with, the longitudinal axis, wherein the displacement of the force transmission element displaces the at least one force sensor along, or substantially in parallel with, the longitudinal axis along a force sensor displacement path toward the at least one resilient means,
transmitting the pressure force to the force transmission element, wherein the applied pressure force exerts a pressure force on the at least one force sensor, and wherein the applied pressure displaces the at least one force sensor along, or substantially in parallel with, the longitudinal axis toward the at least one resilient member along a force transmission element displacement path, and
generating, via the at least one resilient member, an opposing force to the pressure force, wherein the generated opposing force is limited by the displacement of the force transmission element,
wherein the at least one resilient member is electrically conductive and a portion of the at least one resilient member is configured to be a pole contact to the at least one electrical voltage source.

14. The method according to claim 13, wherein the displacement movement of the force transmission element is stopped by at least one stop member when either:
the pressure force exerted by the at least one resilient member acting on the at least one force sensor is below a maximum pressure force load of the force sensor over an entire length of the displacement path, or
after a displacement of the force transmission element, the pressure force acting on the at least one force sensor is below the maximum pressure force load of the force sensor.

15. The electronic pen according to claim 3, wherein the spring element is formed as a leaf spring.

16. The electronic pen according to claim 12, wherein electronic pen comprises a pen housing and a force sensor housing, and wherein the stopping member is a rib of the pen housing or a portion of the force sensor housing.

17. The method according to claim 13, wherein the displacement movement of the force transmission element is stopped by at least one stop member when:
the pressure force exerted by the at least one resilient member acting on the at least one force sensor is below a maximum pressure force load of the force sensor over an entire length of the displacement path, and after a displacement of the force transmission element, the pressure force acting on the at least one force sensor is below the maximum pressure force load of the force sensor.

* * * * *